United States Patent
Kumar et al.

(10) Patent No.: US 9,201,876 B1
(45) Date of Patent: Dec. 1, 2015

(54) CONTEXTUAL WEIGHTING OF WORDS IN A WORD GROUPING

(75) Inventors: Shailesh Kumar, Hyderabad (IN); Mahesh Chhaparia, Hyderabad (IN); Shweta Pathak, Hyderabad (IN)

(73) Assignee: GOOGLE INC., Mountain View, CA (US)

( * ) Notice: Subject to any disclaimer, the term of this patent is extended or adjusted under 35 U.S.C. 154(b) by 763 days.

(21) Appl. No.: 13/482,296

(22) Filed: May 29, 2012

(51) Int. Cl.
- *G06F 17/00* (2006.01)
- *G06F 17/30* (2006.01)
- *G06F 17/27* (2006.01)
- *G06F 17/28* (2006.01)
- *G06F 17/20* (2006.01)

(52) U.S. Cl.
CPC .............. *G06F 17/30* (2013.01); *G06F 17/20* (2013.01); *G06F 17/27* (2013.01); *G06F 17/28* (2013.01)

(58) Field of Classification Search
CPC ............ G06F 17/2827; G06F 17/2836; G06F 17/30675; G06F 17/30707; G06F 17/2785; G06F 17/279; G06F 17/2881; G06F 17/30539; G06F 17/30684; G06F 17/2795; G06F 17/3069; G06F 17/30864; G06F 17/274; G06F 17/277; G06F 17/27; G10L 15/04; G10L 15/05; G10L 15/14
USPC ..................................... 704/7–10, 252, 256.4
See application file for complete search history.

(56) References Cited

U.S. PATENT DOCUMENTS

| | | | | |
|---|---|---|---|---|
| 5,541,836 A | * | 7/1996 | Church et al. | 704/7 |
| 5,652,898 A | * | 7/1997 | Kaji | G06F 17/2735 704/10 |
| 6,098,033 A | * | 8/2000 | Richardson | G06F 17/277 704/1 |
| 6,167,377 A | * | 12/2000 | Gillick et al. | 704/240 |
| 6,678,679 B1 | * | 1/2004 | Bradford | |
| 7,912,699 B1 | * | 3/2011 | Saraclar et al. | 704/9 |
| 2002/0116170 A1 | * | 8/2002 | Corman et al. | 704/1 |
| 2002/0128821 A1 | * | 9/2002 | Ehsani et al. | 704/10 |
| 2002/0188587 A1 | * | 12/2002 | McGreevy | G06F 17/30666 |
| 2002/0188599 A1 | * | 12/2002 | McGreevy | G06F 17/30539 |
| 2003/0004914 A1 | * | 1/2003 | McGreevy | G06F 17/30684 |
| 2003/0078913 A1 | * | 4/2003 | McGreevy | G06F 17/30395 |
| 2003/0101181 A1 | * | 5/2003 | Al-Kofahi | G06F 17/30707 |
| 2005/0060304 A1 | * | 3/2005 | Parikh | G06F 17/30011 |
| 2007/0016571 A1 | * | 1/2007 | Assadian et al. | 707/5 |
| 2007/0083357 A1 | * | 4/2007 | Moore | G06F 17/2827 704/4 |
| 2007/0100680 A1 | * | 5/2007 | Kumar et al. | 705/10 |
| 2007/0136251 A1 | * | 6/2007 | Colledge | G06F 17/3064 |
| 2008/0059187 A1 | * | 3/2008 | Roitblat | G06F 17/30684 704/257 |
| 2008/0221866 A1 | * | 9/2008 | Katragadda | G06F 17/2223 704/8 |
| 2008/0300857 A1 | * | 12/2008 | Barbaiani | G06F 17/2827 704/4 |
| 2009/0119090 A1 | * | 5/2009 | Niu | G06F 17/24 704/1 |
| 2010/0057509 A1 | * | 3/2010 | Kumar et al. | 705/7 |
| 2010/0082511 A1 | * | 4/2010 | Niu | G06F 17/30675 706/21 |
| 2010/0082620 A1 | * | 4/2010 | Jennings, III | G06Q 10/10 707/736 |
| 2010/0153105 A1 | * | 6/2010 | Di Fabbrizio | G06F 17/279 704/235 |
| 2010/0223276 A1 | * | 9/2010 | Al-Shameri | G06F 17/30333 707/769 |

* cited by examiner

*Primary Examiner* — Abdelali Serrou
(74) *Attorney, Agent, or Firm* — Middleton Reutlinger

(57) ABSTRACT

Methods and apparatus related to contextual weighting of words. Methods are provided for determining co-occurrence relationships between words in a corpus of word groupings and for contextually weighting words in a word grouping as a function of which other words are present in the word grouping.

11 Claims, 3 Drawing Sheets

| | |
|---|---|
| 9.100 | jumbo |
| 9.057 | peanuts |
| 8.056 | alligator |
| 7.995 | bald |
| 7.179 | nikko |
| 7.078 | map |
| 7.001 | reserve |
| 6.895 | fl |
| 6.256 | duck |
| 6.601 | flight |
| 5.351 | birds |
| 5.022 | state |
| 4.020 | florida |
| 3.989 | water |
| 3.711 | nature |
| 3.651 | park |

| | |
|---|---|
| 10.502 | birds |
| 7.898 | nature |
| 6.789 | water |
| 6.651 | florida |
| 6.467 | alligator |
| 5.956 | duck |
| 5.892 | park |
| 5.209 | reserve |
| 4.615 | state |
| 4.404 | flight |
| 4.374 | fl |
| 2.858 | bald |
| 0.212 | map |
| 0 | jumbo |
| 0 | peanuts |
| 0 | nikko |

CONTEXTUAL WEIGHTING OF WORDS IN A WORD GROUPING

BACKGROUND

This specification is directed generally to text mining. Text mining involves the processing of text data to make the text data suitable for one or more applications such as, for example, text classification, text clustering, information retrieval, and/or key phrase detection. Text mining attempts to represent unstructured text data in a structured format that can be processed meaningfully for one or more text mining applications.

One text representation is called the "Bag-of-Words" model or the "Vector Space" model. In the Bag-of-Words model all unique words in a document are given a weight that is based on three factors: (a) the number of times the word occurred in the various fields of the document, (b) the importance of the field(s) in which the word occurred in the document, and/or (c) the document frequency of the word in the corpus (e.g., the number or fraction of documents in the corpus that contain the word at least once). For example, a word in a document will receive a higher relative weight in the Bag-of-Words model if it occurs more often, in more important fields in the document (document centric weight component) and rarely in the corpus (corpus centric weight component). Term Frequency Inverse Document Frequency (TFIDF) is an example of such a representation that combines the document centric weight component with the corpus centric weight component for each unique word in the document.

SUMMARY

The present disclosure is directed to methods and apparatus for contextual weighting. For example, some implementations are directed to methods and apparatus for determining co-occurrence relationships between words in a corpus that may be utilized in providing contextual weighting to words of a word grouping. Also, for example, some implementations are directed to inventive methods and apparatus for contextually weighting words in a word grouping based on the co-occurrence consistency of word pairs in the word grouping.

In some implementations a computer implemented method of determining a co-occurrence relationship between words in a corpus of word groupings is described that includes the steps of: identifying a plurality of word pairs from a vocabulary of words; determining, utilizing one or more processors, a co-occurrence probability for each of the word pairs in a corpus having a plurality of word groupings, wherein each co-occurrence probability is based on the probability of co-occurrence of a single of the word pairs in a single of the word groupings; determining, utilizing one or more processors, a co-occurrence consistency for each of the words pairs by comparing the co-occurrence probability for each of the word pairs to an incidental occurrence probability for each of the word pairs; and creating a co-occurrence consistency matrix with the co-occurrence consistency for each of the word pairs.

This method and other implementations of technology disclosed herein may each optionally include one or more of the following features.

The method may further include omitting certain of the word pairs from the co-occurrence consistency matrix having co-occurrence consistency that is below a co-occurrence consistency threshold value.

The step of determining the co-occurrence probability for each of the word pairs may include determining, for each of the word pairs, a number of the word groupings in the corpus in which each of the word pairs is present. In some versions of those implementations a co-occurrence count matrix with the number for each of the word pairs may be created. The number may optionally be a weighted number. The method may further include omitting certain of the word pairs having a number of the word groupings in the corpus in which each of the word pairs is present that is below a co-occurrence count threshold value from the co-occurrence count matrix. The method may further include omitting certain of the word pairs from the co-occurrence consistency matrix having co-occurrence consistency that is below a co-occurrence consistency threshold value. The step of determining the co-occurrence consistency for each of the words pairs may include comparing the co-occurrence probability of each of the word pairs to marginal probabilities of the words of each of the word pairs. The step of determining the co-occurrence probability for each of the word pairs may include determining a co-occurrence total for all of the word pairs and dividing the number of each of the word pairs by the co-occurrence total.

The step of determining the co-occurrence probability for each of the word pairs may include determining a weighted number of the word groupings in the corpus in which each of the word pairs is present, the weighted number weighting at least one of word frequency of occurrence and word field importance.

The word groupings may include at least one of tags for images, tags for videos, ad keywords, words from queries, words from documents, and words from social networking posts.

In some implementations a computer implemented method of contextually weighting words in a word grouping as a function of which other words are present in the word grouping is described that includes the steps of: identifying a co-occurrence consistency for each of a plurality of word pairs in a word grouping having a plurality of words, wherein each co-occurrence consistency is based on a probability of co-occurrence of a single of the word pairs in a word grouping of a corpus; performing, utilizing one or more processors, a link analysis on the words utilizing the co-occurrence consistency as a first weighting factor and utilizing at least one of an independence based document centric component and an independence based corpus centric component as a second weighting factor; and weighting, utilizing one or more processors, the words as a function of the link analysis.

This method and other implementations of technology disclosed herein may each optionally include one or more of the following features.

The first weighting factor and the second weighting factor may be weighted approximately evenly in the step of performing the link analysis on the words.

The first weighting factor may be weighted more heavily than the second weighting factor in the step of performing the link analysis on the words.

The weighting of the first weighting factor to the second weighting factor in the step of performing the link analysis on the word may be dependent on at least one characteristic of the word grouping. The characteristic may include word grouping type of the word grouping. The characteristic may include number of words of the word grouping.

The co-occurrence consistency for each of the word pairs may be extracted from a master co-occurrence consistency matrix.

The co-occurrence consistency for each of the word pairs may factor in how much more likely than random it is for each of the word pairs to co-occur in the word grouping of the corpus.

The word grouping may include words from a web page.

The link analysis may be an iterative algorithm that assigns a numerical weighting to each of the words.

The at least one of an independence based document centric component and an independence based corpus centric component may be a term frequency—inverse document frequency component.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein process multiple words in a word grouping to create weightings of those words for utilization in one or more meaningful text mining applications. These weightings represent new weightings that are derived from multiple words of the word grouping and co-occurrence consistencies associated with the words. The contextual weightings may be utilized by one or more text mining applications to provide improved performance of the text mining applications. Particular implementations of the subject matter described herein process words in a plurality of word groupings to determine co-occurrence consistencies of word pairs of the words for utilization in contextually weighting words. The co-occurrence consistencies of the word pairs represent new values that are derived from analysis of those words.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
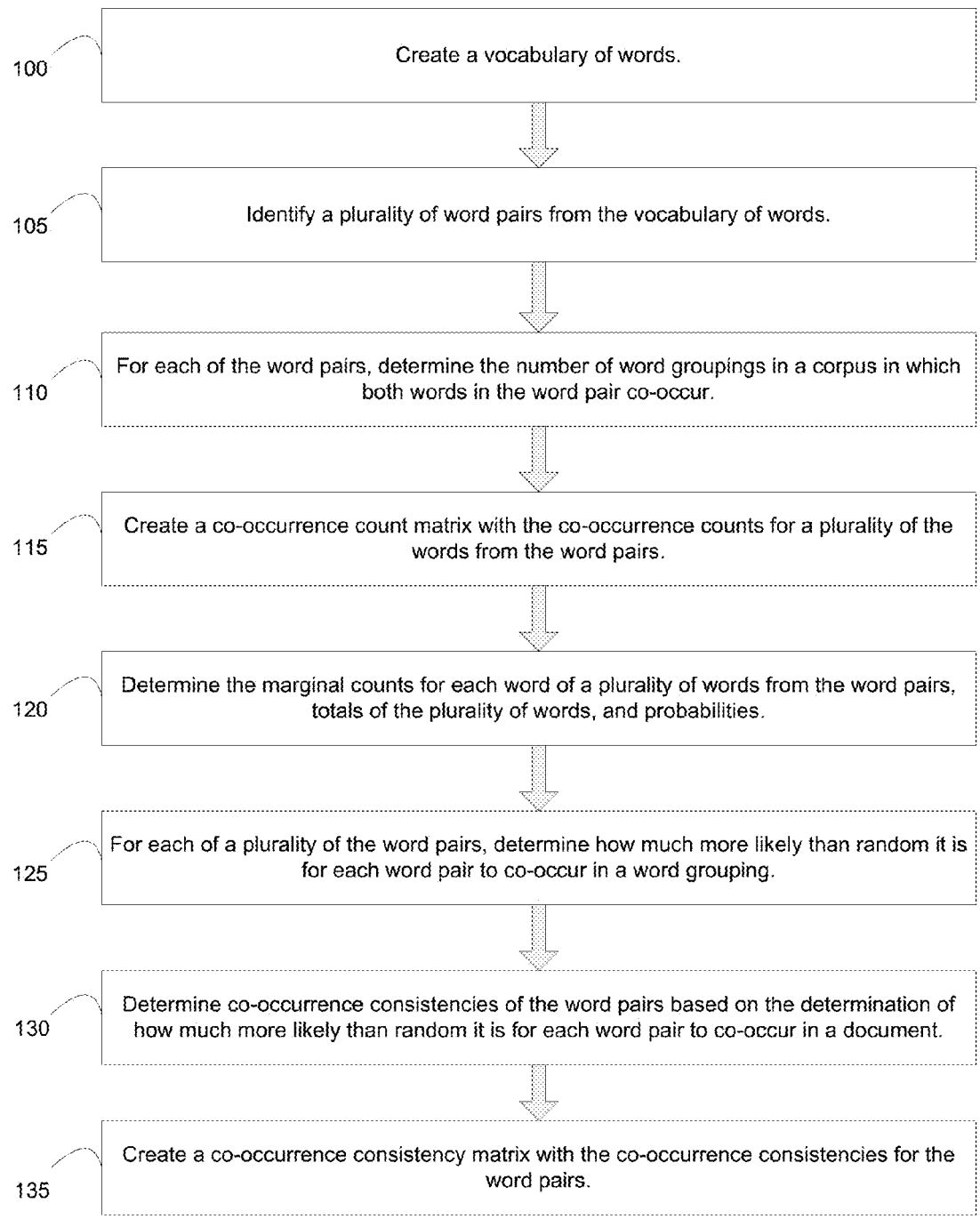
FIG. 1 is a flow chart illustrating an implementation of a method of determining co-occurrence relationships between words in a corpus of word groupings.

Referring to FIG. 1, a flow chart illustrating steps of an implementation of a method of determining co-occurrence relationships between words in a corpus of word groupings is illustrated. A corpus of word groupings is a set of electronically stored word groupings from one or more sources that are analyzed to determine one or more characteristics of the words of the word groupings. For example, the corpus of word groupings described herein is utilized to determine co-occurrence relationships between words of the word groupings. Other implementations may perform the steps in a different order, omit certain steps, and/or perform different and/or additional steps than those illustrated in FIG. 1. For convenience, aspects of FIG. 1 will be described with reference to a system of one or more computers that perform the process. The system may be, for example, the co-occurrence relationship determination engine 310 of FIG. 3.

Figure 3:
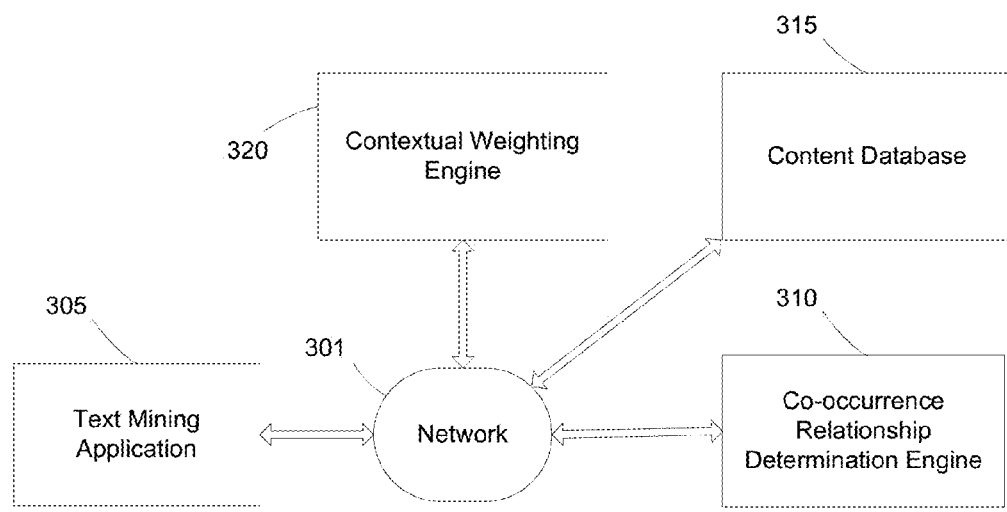
FIG. 3 is a block diagram of an example environment in which co-occurrence relationships between words in a corpus of word groupings may be determined and/or words in a word grouping may be weighted as a function of which other words are present in the word grouping.

At step 100 a vocabulary of words is created. In some implementations the vocabulary of words may be obtained from the content database 315 (FIG. 3). For example, the content database 315 may include one or more storage mediums having one or more documents and unique words from the documents may be utilized to form the vocabulary of words. The documents may optionally include all of those word groupings of the corpus of step 110. For example, in some implementations the content database 315 may include a plurality of word groupings of one or more tags for media (e.g., videos, images, sounds), all the unique tags may form the vocabulary of words, and the plurality of word groupings may form the corpus. Also, for example, in some implementations the content database 315 may include a plurality of documents each having a plurality of words, the unique words may form the vocabulary of words, and the plurality of documents may form the corpus. Each of the documents may include all or portions of one or more documents such as, for example, HTML documents, PDF documents, DOC documents, query documents, keyword documents, and/or media tag documents. For example, in some implementations one document may include a portion of another document such as, for example, tags of an HTML document. Also, for example, in some implementations a document may include portions of a plurality of documents such as, for example, portions of the titles of a plurality of PDF documents and DOC documents. One or more canonicalization rules may optionally be applied to words from the documents to modify and/or omit certain words. For example, stemming of words, phrasing of words, removal of low frequency words, and/or removal of stop words may be utilized. Also, for example, in some implementations the vocabulary of key words may be derived from one or more preexisting listings of words. For example, a preexisting listing of words that includes a plurality of words from a language that have optionally been modified utilizing canonicalization rules may be utilized.

At step 105 a plurality of word pairs from the vocabulary of words are identified. For example, the co-occurrence relationship determination engine 310 may identify a plurality of word pairs from the vocabulary of words that occur at least once in any of the word groupings of the corpus of step 110. Also, for example, in some implementations the content database 315 may include a plurality of word groupings each having one or more words and any word pairs that are present in any of the word groupings may be identified. Also, for example, all possible combinations of words from the vocabulary of key words may be identified as word pairs.

At step 110, for each of the identified word pairs, the number of word groupings in a corpus in which both words in the word pair co-occur is determined. For example, the co-occurrence relationship determination engine 310 may identify the number of word groupings in a corpus in which both words in the word pair co-occur. The word groupings of the corpus may include any grouping of words for which it may be desirable to perform text mining to rank words in the grouping of words. For example, one or more of the word groupings of the corpus may include: a plurality of tags for media such as, for example images, videos, and/or sounds; a multi-word query such as, for example, a search engine query; adwords such as, for example, a set of keywords associated with an advertisement; a plurality of words from a field in a document such as, for example, a set of keywords in a title, URL, and/or anchor; a plurality of words of a document such as, for example, all or a set of words in an entire document; and/or a plurality of keywords such as, for example, a set of explicitly annotated keywords in a document such as, for example, named entities in a news story, MeSH terms in Medline data, and/or keywords in a scientific publication. One of ordinary skill in the art, having had the benefit of the present disclosure, will recognize and appreciate that the methods and apparatus described herein may be applied to one or more of a variety of word groupings. The corpus may be represented by the equation: $X=\{x^n=\{[x_l^n, w_l^n]\}_{l=1}^{L_n}\}_{n=1}^{N}$, where N is the number of word groupings in the corpus; where $x_l^n \in V$=the $l^{th}$ word in the $n^{th}$ word grouping; where $w_l^n$=the independence presumption based weight of the $l^{th}$ word in the $n^{th}$ word grouping; and $L_n$=the number of unique words in the $n^{th}$ word grouping.

In some implementations an un-weighted count of the number of word groupings in the corpus in which both words in the word pair co-occurs is determined. For example, in some implementations an un-weighted count of the of the number of word groupings in the corpus in which both words in the word pair co-occurs is determined using the following equation: $\eta(v_\alpha, v_\beta) = \eta(v_\beta, v_\alpha) = \Sigma_{n=1}^{N} \delta(v_\alpha \in x^n) \delta(v_\beta \in X^n)$ where $v_\alpha$ is a first word of a word pair and $v_\beta$ is a second word of the word pair; where N is the number of word groupings in the corpus; $x^n$ is the $n^{th}$ word grouping; and where $\delta$ is either 1 (if condition is true) or 0 (if condition is false). For example, if the first word of a word pair is "bird" and the second word of the word pair is "feather," a count of the number of word groupings in the corpus in which "bird" and "feather" both occur will be determined. This is done for each of the identified word pairs in the corpus.

In some implementations a weighted count of the number of word groupings in the corpus in which both words in the word pair co-occurs is determined. The weighted count still determines the number of word groupings in which the word pair occurs, but in doing so also takes into account an independence presumption based weight of one or both words in the word pair in each of the word groupings in which the word pair occurs. For example, the independence presumption based weighted count of a word pair in a word grouping may take into account one or more independence based presumptions such as property weighting (e.g., how often the word occurs in the word grouping, how early the word occurs in the word grouping, and/or decorations applied to the word in the word grouping (bold, italics, font, etc.), field weighting (e.g., does the word occur in an important field such as the title), and/or corpus weighting (e.g., is the word a rare word in the corpus) of one or both words in the word pair. For example, if the first word of the word pair is "bird" and the second word of the word pair is "feather," a count of the number of word groupings in the corpus in which "bird" and "feather" both occur will be determined that takes into account the independence presumption based weight of "bird" and "feather" in each of the word groupings. For instance, if "bird" and "feather" both have a high independence presumption based weight in a word grouping (e.g., in important fields and/or occur frequently and early), then the count for that word grouping will be weighted higher than it would be for a word grouping in which "bird" and "feather" both have a low independence presumption based weight (e.g., not in important fields and/or not frequently occurring).

For example, in some implementations a weighted count of the number of word groupings in the corpus in which both words in the word pair co-occur is determined using the following equation:

$$\eta(v_\alpha, v_\beta) = \sum_{n=1}^{N} g(w_n(v_\alpha), w_n(v_\beta)); \text{ where: } w_n(v_\alpha) = \begin{cases} 0 \text{ if } (v_\alpha \notin x^n) \\ w_l^n \text{ if } (v_\alpha = x_l^n) \end{cases};$$

where: $w_n(v_\beta) =$ $$\begin{cases} 0 \text{ if } (v_\beta \notin x^n) \\ w_l^n \text{ if } (v_\beta = x_l^n); \end{cases} \text{ where } g(w_n(v_\alpha), w_n(v_\beta)) = \text{symmetric monotonic}$$

function of the two weights; where $v_\alpha$ is a first word of a word pair and $v_\beta$ is a second word of the word pair; where N is the number of word groupings in the corpus; $x^n$ is the $n^{th}$ word grouping; where $x_l^n$ is the $l^{th}$ word in the $n^{th}$ word grouping; and where $w_l^n$ is the weight of the $l^{th}$ word in the $n^{th}$ word grouping.

$w_l^n$ is based on the independence presumption based weighted count of a word in a word grouping that may take into account one or more independence based presumptions such as property weighting, field weighting, and/or corpus weighting of the word. In some implementations at least some the independence presumption based weights for the words may be provided. For example, the weights may be provided in combination with the vocabulary of words (e.g., a term frequency weight may be provided with each of the words of the vocabulary of words, a term frequency—inverse document frequency weight may be provided with each of the words of the vocabulary of words, and/or other assigned or determined weight may be provided with each of the words of the vocabulary of words). In some implementations at least some of the independence presumption based weights may additionally or alternatively be determined via analysis of the vocabulary of words in the corpus (e.g., by the co-occurrence relationship determination engine 310). Optionally, if independence presumption based weights are not provided and/or determined for one or more of the words a default weight (e.g., 1) may be assigned to such words.

In some implementations g $(w_n(v_\alpha), w_n(v_\beta))$ may be the arithmetic mean of the two weights $$\left(\frac{(w_\alpha + w_\beta)}{2}\right).$$

In some implementations g $(w_n(v_\alpha), w_n(v_\beta))$ may be the geometric mean of the two weights $(\sqrt{w_\alpha w_\beta})$. In other implementations other calculations of the two weights may be utilized such as, for example, other asymmetric monotonic functions of the two weights.

It may be desirable to determine an un-weighted count of the number of word groupings in the corpus in which both words in the word pair co-occurs in certain situations and to determine a weighted count in certain situations. For example, in some implementations where no inherent notation of weight is present in the word groupings (e.g., non-prioritized tag sets for images or video) it may be desirable to utilize an un-weighted count. Also, for example, in some implementations where no independence presumption based weighting is provided in combination with the vocabulary of words, it may be desirable to utilize an un-weighted count. Also, for example, in some implementations where an inherent notation of weight is present in the word groupings (e.g., web pages) it may be desirable to utilize a weighted count. Also, for example, in some implementations where independence presumption based weighting is provided in combination with the vocabulary of words, it may be desirable to utilize a weighted count.

A co-occurrence count matrix may optionally be formed in step 115 that identifies the number (either weighted or un-weighted) of word groupings in the corpus in which each of the identified word pairs co-occurs. For example, the co-occurrence relationship determination engine 310 may form the co-occurrence count matrix in step 115. The co-occurrence count matrix may be size M by M, where M is the number of unique words from the identified word pairs from the vocabulary of words. In some implementations pruning of certain word pairs from the count of the number of word groupings in the corpus in which both words in the word pair co-occurs may occur. For example, in implementations in which a co-occurrence count matrix is created, at least data associated with those word pairs that occur in less than a threshold number of word groupings may be removed from the co-occurrence count matrix. In some implementations the threshold number may be a set number (e.g., 30). In some implementations the threshold number may be statistically determined (e.g., statistical outliers or a set deviation from a statistical mean or medium). One of ordinary skill in the art, having had the benefit of the present disclosure, will recognize and appreciate that one or more additional and/or alternative bases may optionally be utilized for pruning certain word groupings that co-occur with relatively low frequency.

In some implementations an existing co-occurrence count matrix may optionally be modified. For example, as a corpus of groupings of words grows and adds new groupings of words, it may be desirable to update the co-occurrence count matrix with the new groupings of words. In some implementations, to update the co-occurrence count matrix for each of a plurality of identified word pairs in the new grouping of words, the number of word groupings in the new grouping in which both words in the word pair co-occurs is determined (e.g., as described, for example, with respect to step 110) to create a new grouping co-occurrence count matrix of the new grouping of words. The new grouping co-occurrence count matrix may then be added to the already existing co-occurrence count matrix to thereby update the co-occurrence count matrix. New groupings of words may be added to the co-occurrence count matrix on one or more of a variety of bases. For example, in some implementations new groupings of words may be added every hour, every day, every week, as soon as a new groupings of words is received, as soon as 1,000 new groupings of words are received, etc.

Also, for example, as certain groupings of words are deleted from a corpus (or are determined to no longer represent timely or pertinent word groupings) it may be desirable to update the co-occurrence count matrix to reflect the removal of such groupings of words. In some implementations, to update the matrix for each of a plurality of identified word pairs in the removed grouping of words, the number of word groupings in a corpus in which both words in the word pair co-occurs is determined (e.g., as described, for example, with respect to step 110 to create a new grouping co-occurrence count matrix of the removed grouping of words. The new grouping co-occurrence count matrix may then be subtracted from the already existing co-occurrence count matrix to thereby update the co-occurrence count matrix. Groupings of words may be removed from the co-occurrence count matrix on one or more of a variety of bases. For example, in some implementations groupings of words may be removed when the content with which they are associated is deleted, may be removed on a first-in-first-out basis in which the corpus is set to maintain a fixed amount of the most recent word groupings, and/or may be removed after being a part of the corpus utilized for more than a certain time period (e.g., more than a day, more than a week, more than two years).

At step 120, the marginal counts for each word from the word pairs are determined, a total count for the words from the word pairs are determined, and probabilities are determined. For example, the co-occurrence relationship determination engine 310 may manipulate the co-occurrence count matrix optionally created in step 115 to determine marginal counts for each word, determine a total count for the words, and determine probabilities.

A marginal count for a word may be determined by summing the number (either weighted or un-weighted) of word groupings determined in step 110 in which the word was part of a word pair in a word grouping. For example, if the word "bird" occurred only with the word "sky" in 5 word groupings in a corpus, occurred with the word "feather" in 10 word groupings in the corpus, and appeared with the word "nest" in 7 word groupings in the corpus (and did not co-occur with any other words), then the marginal count for the unweighted count of the word "bird" would be 22 (5+10+7). In some implementations the marginal counts may be determined by summing each row in the co-occurrence count matrix. In some implementations co-occurrence marginal counts may be determined using the following equation:

$$\eta(v_\alpha) = \sum_{v_\beta \in V \backslash v_\alpha} \eta(v_\alpha, v_\beta)$$

Totals for all of the words may be determined by summing the number (either weighted or un-weighted) of all the various word groupings determined in step 110 in which an identified word pair was present. In some implementations the totals may be determined by summing all of the numerical elements in the co-occurrence count matrix. In some implementations the totals may be determined using the following equation:

$$\eta = \sum_{(v_\alpha, v_\beta) \in V \times V} \eta(v_\alpha, v_\beta)$$

The determined marginal counts and totals may be utilized to normalize the co-occurrence count values to probabilities. A co-occurrence probability may be determined for each word pair by dividing the co-occurrence count for that word pair by the determined total co-occurrence counts for all word pairs. For example, in some implementations the co-occurrence probability for a word pair may be determined using the following equation:

$$P(v_\alpha, v_\beta) = \frac{\eta(v_\alpha, v_\beta)}{\eta}$$

A marginal probability for each word may be determined by dividing the determined marginal count for that word by the determined total co-occurrence counts for all words. For example, in some implementations the marginal probability for a word may be determined using the following equation:

$$P(v_\alpha) = \frac{\eta(v_\alpha)}{\eta}$$

In some implementations smoothed versions of the counts for each word from the word pairs and/or total counts for the word pairs may be utilized. For example, one or more smoothing mechanisms may be utilized to convert raw counts into probabilities such as, for example, Good-Turing smoothing, Kneser-Ney smoothing, and/or Witten-Bell smoothing. In some implementations it may be desirable to utilize a smoothing mechanism when the corpus size is small and marginal counts and/or total counts are too low to provide probability estimates of a desired robustness.

At step 125, for each of the word pairs it is determined how much more likely than random/incidental it is for each word pair to co-occur in a word grouping. For example, the co-occurrence relationship determination engine 310 may determine how much more likely than random it is for each word pair to co-occur in a word grouping. In some implementations it is determined for all of the word pairs how much more likely than random it is for each word pair to co-occur in a word grouping. For example, the co-occurrence probability of a word pair determined in step 120 may be compared to the marginal probabilities of the words of the word pair. If the co-occurrence probability of a word pair compared to the marginal probabilities of the words of the word pair is relatively high, then it is likely that those words actually have a correlation and are not co-occurring just by random chance. If the co-occurrence probability of a word pair compared to the marginal probabilities of the words of the word pair is relatively low, then it is likely that many of the co-occurrences of those words is likely due to "incidental chance." For example, two fairly common words such as "food" and "cars" may have a relatively high co-occurrence probability in a corpus due to the popularity of both of the terms. However, it is unlikely that the two words actually have a strong correlation to one another. Accordingly, by comparing the co-occurrence probability of "food" and "cars" to the marginal probabilities of "Food" and "cars," it is likely to be determined that many co-occurrences of those two words are likely due to incidental chance and the co-occurrence probability of such word pairs may be altered to create a co-occurrence consistency that downgrades the statistical significance associated with that word pair.

The comparison of the co-occurrence probability to the marginal probabilities of the words of the word pair may be utilized to determine a co-occurrence consistency for each of the word pairs. For example, a calculation based on the ratio of the co-occurrence probability to the marginal probabilities of the words of the word pair may be the co-occurrence consistency for each of the word pairs. In some implementations the co-occurrence consistency for each of the word pairs may be determined using the following cosine equation:

$$\phi(v_\alpha, v_\beta) = \frac{P(v_\alpha, v_\beta)}{\sqrt{P(v_\alpha)P(v_\beta)}}$$

In some implementations the co-occurrence consistency for each of the word pairs may be determined using the following pointwise mutual information equation:

$$\phi(v_\alpha, v_\beta) = \log\left(\frac{P(v_\alpha, v_\beta)}{P(v_\alpha)P(v_\beta)}\right)$$

In some implementations the co-occurrence consistency for each of the word pairs may be determined using the following Jaccard coefficient equation:

$$\phi(v_\alpha, v_\beta) = \frac{P(v_\alpha, v_\beta)}{P(v_\alpha) + P(v_\beta) - P(v_\alpha, v_\beta)}$$

Although specific implementations of equations for determining co-occurrence consistencies are described herein, one of ordinary skill in the art, having had the benefit of the present disclosure, will recognize and appreciate that other determinations of how much more likely than incidental it is for each word pair to co-occur in a word grouping may be utilized. For example, other comparisons of the co-occurrence probability to the marginal probabilities of the words of the word pair may be utilized to determine a co-occurrence consistency for each of the word pairs.

A co-occurrence consistency matrix may optionally be formed in step 135 that identifies the co-occurrence consistency of the word pairs. For example, the co-occurrence relationship determination engine 310 may form the co-occurrence consistency matrix in step 135. The co-occurrence count matrix may be size M by M. In some implementations the co-occurrence consistency matrix may be represented by the following equation:

$$\Phi = [\varnothing(v_\alpha, v_\beta)] : \forall (v_\alpha, v_\beta) \in V \times V$$

In some implementations, the co-occurrence consistency matrix created in step 135 may optionally omit certain word pairs (either completely omit the word pairs or omit co-occurrence consistency data for certain word pairs) to omit those word pairs that are determined to have little correlation to one another. For example, in implementations in which a co-occurrence consistency matrix is created, at least data associated those word pairs that have less than a threshold co-occurrence consistency value may be removed from the co-occurrence consistency matrix. In some implementations the threshold co-occurrence consistency value may be a set number. For instance, when a cosine function is utilized to determine the co-occurrence consistency any co-occurrence consistency values below 0.1 may be removed from the co-occurrence consistency matrix. In some implementations the threshold number may be empirically determined. One of ordinary skill in the art, having had the benefit of the present disclosure, will recognize and appreciate that one or more additional and/or alternative bases may optionally be utilized for pruning certain word pairs that co-occur with relatively low consistency.

Figure 2:
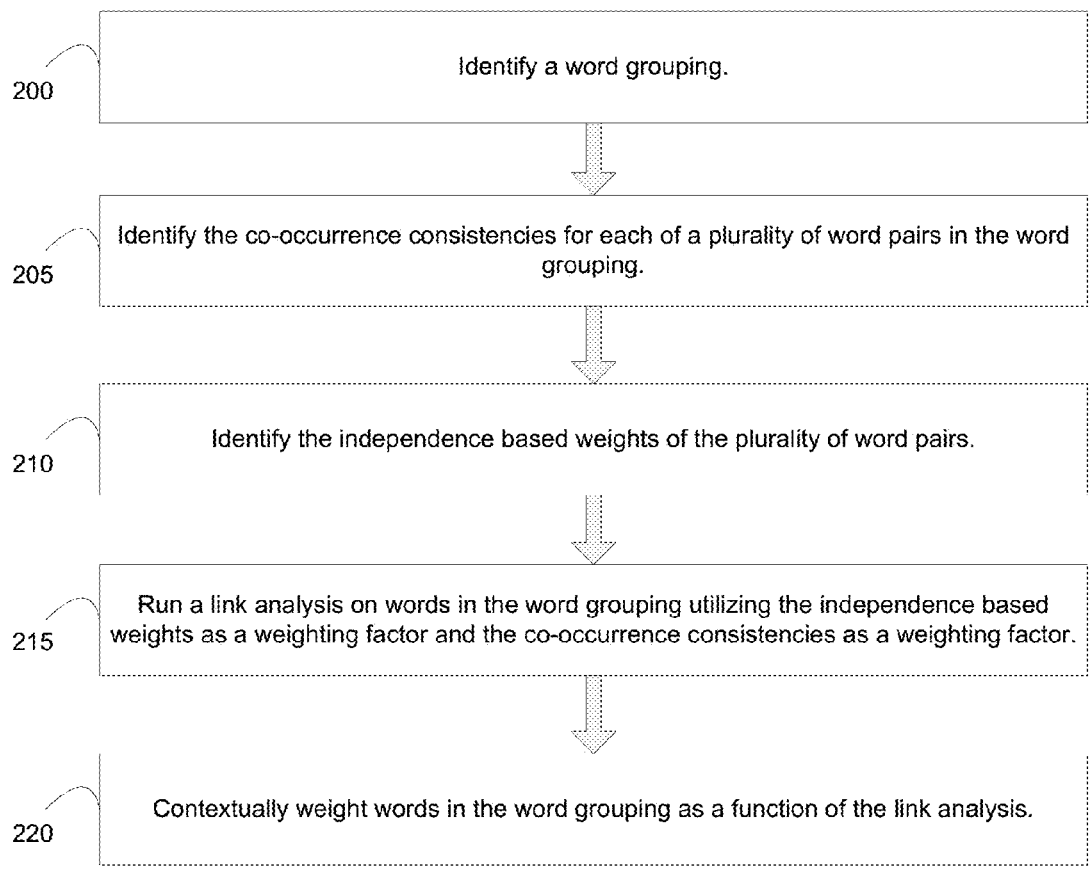
FIG. 2 is a flow chart illustrating an implementation of a method of contextually weighting words in a word grouping as a function of which other words are present in the word grouping.

Referring to FIG. 2, a flow chart illustrating steps of an implementation of ranking words in a word grouping as a function of which other words are present in the word grouping is illustrated. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may be, for example, the contextual weighting engine 320 of FIG. 3.

At step 200, a word grouping is identified. In some implementations the contextual weighting engine 320 may identify the word grouping. The word grouping may be identified from a supplied listing of words such as words from a document from one or more sources such as content database 315. For example, a plurality of tags for an image may be provided and all of the tags may form the word grouping. Also, for example, a plurality of words in a document may be provided and one or more of the words of the document may form the word grouping. For instance, all the words of the document may form the word grouping, only identified keywords of the document may form the word grouping, only certain randomly selected words from the document may form the word grouping, or all the canonicalized words of the document may form the word grouping.

At step 205, the co-occurrence consistencies for each of a plurality of the word pairs in the word grouping are identified. In some implementations the contextual weighting engine 320 may identify the co-occurrence probabilities. In some implementations co-occurrence consistencies are identified for all possible word pairs of the word grouping identified in step 200. In some implementations the co-occurrence consistencies may be identified from the co-occurrence consistency matrix created in step 125 of FIG. 1. For example, the co-occurrence consistency matrix may be stored in content database 315 and consulted to obtain co-occurrence consistencies for each of the word pairs of the identified word grouping.

In some implementations a co-occurrence consistency matrix for the identified word grouping may be created based on the co-occurrence consistency matrix created in step 125 of FIG. 1. For instance, a L by L matrix (where L is the number of words in the word grouping) may be extracted from the co-occurrence consistency matrix created in step 125 of FIG. 1 as represented in the following equation: $\Phi(x) = [\emptyset(x_i, x_j)]$:L×L Matrix; wherein the word grouping is represented by the following equation: $x = \{x_1, x_2, \ldots x_L\}$.

At step 210, at least one of an independence based document centric weight and an independence based corpus centric weight are identified. In some implementations the contextual weighting engine 320 may identify the independence based document centric weight and/or the independence based corpus centric weight. In some implementations the independence based document centric weight and/or independence based corpus centric weight is a term frequency—inverse document frequency weight. In some implementations at least some of the independence presumption based weights for the words may be provided. For example, the weights may be provided in combination with the word grouping (e.g., a term frequency—inverse document frequency weight may be provided with each of the words of the word grouping). For instance, the word grouping may be previously weighted words from a web page. In some implementations at least some of the independence based weights may additionally or alternatively be determined via analysis of the vocabulary of words in the corpus and/or consultation of a database. Optionally, if independence based weights are not provided and/or determined for one or more of the words of the word grouping a default independence weight may be assigned to such words. The independence based weights for the words of the word grouping are represented in the following equation: $w(x) = \{w_l\}_{l=1}^{L}$.

At step 215, a link analysis of the word grouping is performed utilizing at least one of the identified independence based document centric weights and independence based corpus centric component weights as a weighting factor and utilizing the identified co-occurrence consistencies as a weighting factor. In some implementations the contextual weighting engine 320 may perform the link analysis. In some implementations the link analysis may be performed via a random walk on the L by L matrix (where L is the number of words in the word grouping) that may be extracted from a corpus co-occurrence consistency matrix (e.g., extracted from the co-occurrence consistency matrix created in step 135).

The prior probability of the random walk may be made proportional to the independence based weights of the words of the word grouping. In other words, the probability of picking one of the words from all of the words in the word grouping may be made proportional to the independence based weight of that word relative to the sum of all independence based weights in the word grouping. In some implementations the prior of the random walk may be represented by the following equation:

$$P_0(x_i) = \frac{f_\lambda(w_i)}{\sum_{j=1}^{L} f_\lambda(w_j)},$$

where w is the independence based weight and where $f_\lambda$ is a monotonic function. In some implementations $f_\lambda$ may optionally be omitted. In some implementations $f_\lambda$ may be an increasing monotonic function such as, for example, $f_\lambda(z) = e^{(\lambda \times z)}$ or $f_\lambda(z) = z^\lambda$. Other implementations may utilize other monotonic functions.

In some implementations a document frequency of a word utilized in an independence based weight may be determined using, for example, the following equation: $N(v_m) = \sum_{n=1}^{N} \delta(v_m \in x^n)$; an inverse document frequency of a word utilized in an independence based weight may be determined using, for example, the following equation:

$$IDF(v_m) = \log\left(\frac{N+1}{N(v_m)+1}\right);$$

and/or a term frequency—inverse document frequency of a word utilized in an independence based weight may be determined using, for example, the following equation:

$$\pi_l^n = \frac{w_l^n \times IDF(x_l^n)}{\sqrt{\sum_{l'=1}^{L_n} (w_{l'}^n \times IDF(x_{l'}^n))^2}};$$

wherein $w_l^n$ is the weight of the $l^{th}$ word in the $n^{th}$ document and may be based on, for example, in which fields the word occurs, how often the word occurs in those fields, how early the word occurs in those fields, and/or decorations applied to the word. $w_l^n$ may optionally be omitted in some implementations.

The transition probability from one word of the word grouping to another word of the word grouping may be made proportional to the co-occurrence consistency between the two words. In other words, the probability of transitioning from one of the words to another of the words in the word grouping may be made proportional to the co-occurrence consistency between those words. Accordingly, from a word, the probability of transitioning to a word with high co-occurrence consistency will be greater than the probability of transitioning to a word with low co-occurrence consistency. For example, assuming the words "food" and "cook" have a relatively high co-occurrence consistency and the words "food" and "car" have a relatively low co-occurrence consistency, the likelihood of transitioning from "food" to "cook" will be greater than the likelihood of transitioning from "food" to "car." In some implementations the transition probability of the random walk may be represented by the following equation:

$$P(x_i \mid x_j) = \frac{f_{\lambda'}(\emptyset(x_i, x_j))}{\sum_{j=1}^{L} f_{\lambda'}(\emptyset(x_i, x_j))}$$

where $\emptyset(x_i,x_j)$ is the co-occurrence consistency and where $f_{\lambda'}$ is a monotonic function. In some implementations $f_{\lambda'}$ may optionally be omitted. In some implementations $f_{\lambda'}$ may be an increasing monotonic function such as, for example, $f_{\lambda'}(z) = e^{(\lambda' \times z)}$ or $f_{\lambda'}(z) = z^{\lambda'}$. Other implementations may utilize other monotonic functions.

In some implementations the link analysis may be represented by the following iterative equation, with t being the iteration number:

$$P_{t+1}(x_i) = (1 - \theta)P_0(x_i) + \theta \sum_{\substack{j=1 \\ j \neq i}}^{L} P_t(x_j) P(x_i \mid x_j)$$

θ may be selected to set the relative weighting between the independence based weighting of the word ($P_0(x_i)$) and the dependence/co-occurrence based weighting of the word ($P(x_j) P(x_i|x_j)$). θ may be selected based on one or more characteristics of the word grouping. For example, in text mining applications where the rarity of a word is highly important, it may be desirable to provide the independence based weighting of the word ($P_0(x_i)$, which may take into account inverse document frequency) with greater weight (e.g., a smaller θ). Also, for example, in text mining applications where it is desirable to downgrade the frequency of a word in a document, it may be desirable to provide the dependence based weighting of the word ($P(x_j) P(x_i|x_j)$) with greater weight (e.g., a larger θ).

In some implementations the link analysis may optionally be performed in "offline" applications such as, for example, crawling of documents, web pages, or other groupings of words. In some implementations the link analysis may optionally be performed in real time application such as, for example, analysis of a submitted query (e.g., to determine contextual weighting of the words of the query). In some implementations the link analysis algorithm may be an algorithm such as a PageRank algorithm. For example, the link analysis algorithm may assign a numerical weighting to each word of a word grouping based on the links between that word and other words of the word grouping. The initial probability of a given word may be based on the independence based weighting of the word and the transition probability from that word to another word of the word grouping may be based on the co-occurrence consistency between the two words. One of ordinary skill in the art, having had the benefit of the present disclosure, will recognize and appreciate that other link analysis algorithms may additionally or alternatively be utilized while factoring in both an independence based weighting factor and a co-occurrence probability weighting factor to obtain link analysis results for a word grouping.

At step 220 words in the word grouping are weighted as a function of the link analysis performed in step 215. In some implementations the contextual weighting engine 320 may weight the word grouping as a function of the link analysis. The individual words may be assigned a contextual weight that is based on the link analysis. For example, in some implementations the contextual weight of a word may be assigned based on the converged values of the random walk after multiple iterations of the link analysis of step 215 as represented by the following equation when the probability values have converged: $\pi_i = P_{\infty}(x_i)$.

FIG. 3 illustrates a block diagram of an example environment in which co-occurrence relationships between words in a corpus of word groupings may be determined and/or words in a word grouping may be weighted as a function of which other words are present in the word grouping. The environment includes a communication network 301 that allows for communication between various components of the environment. The communication network 301 facilitates communication between the various components in the environment. In some implementations the communication network may include the Internet, one or more intranets, and/or one or more bus subsystems. The communication network 301 may optionally utilize one or more standard communications technologies, protocols, and/or inter-process communication techniques.

The co-occurrence relationship determination engine 310 may access a corpus of word groupings from content database 315 or elsewhere and utilize such corpus to determine relationships between words in the corpus utilizing techniques as described herein. In some implementations the co-occurrence relationship determination engine 310 may perform one or more of the steps of the method of FIG. 1. The co-occurrence relationship engine 310 may be implemented in hardware, firmware, and/or software running on hardware. For example, the co-occurrence relationship engine 310 may be implemented in one or more computer servers.

The contextual weighting engine 320 may access a word grouping from content database 315 or elsewhere (e.g., from a user submitted query via the Internet) and analyze such word grouping to contextually weight words in the word grouping utilizing techniques as described herein. The contextual weighting engine 320 may perform one or more of the steps of the method of FIG. 2. The contextual weighting engine 320 may be implemented in hardware, firmware, and/or software running on hardware. For example, the contextual weighting engine 320 may be implemented in one or more computer servers. The contextual weighting engine 320 utilizes one or more identified co-occurrence consistencies to rank words based on their contextual weights in the word grouping. In some implementations the co-occurrence consistencies may be obtained, either directly or indirectly (e.g., via content database 315) via the co-occurrence relationship determination engine 310.

The text mining application 305 may utilize the ranking of words from contextual weighting engine 320 for one or more applications such as, for example, text classification, text clustering, information retrieval, and/or key phrase detection. For example, the text mining application 305 may include a search engine. The contextual weighting engine 320 may rank words from a query submitted to the search engine based on the contextual weighting to determine the importance of those words. The contextual weighting engine 320 may additionally or alternatively crawl web pages to determine contextual weights of words in the webpages and thereby provide more meaningful results to a query submitted to the search engine. The text mining application 305 may be implemented in hardware, firmware, and/or software running on hardware. For example, the text mining application 305 may be implemented in one or more computer servers.

Many other configurations are possible having more or less components than the environment shown in FIG. 3. For example, although both the co-occurrence relationship determination engine 310 and the contextual weighting engine 320 are illustrated in FIG. 3, it is understood that in some environments only the co-occurrence relationship determination engine 310 or only the contextual weighting engine 320 may be provided. Also, for example, in some environments the text mining application 305 may be omitted.

Figures 4A, 4B, 5:
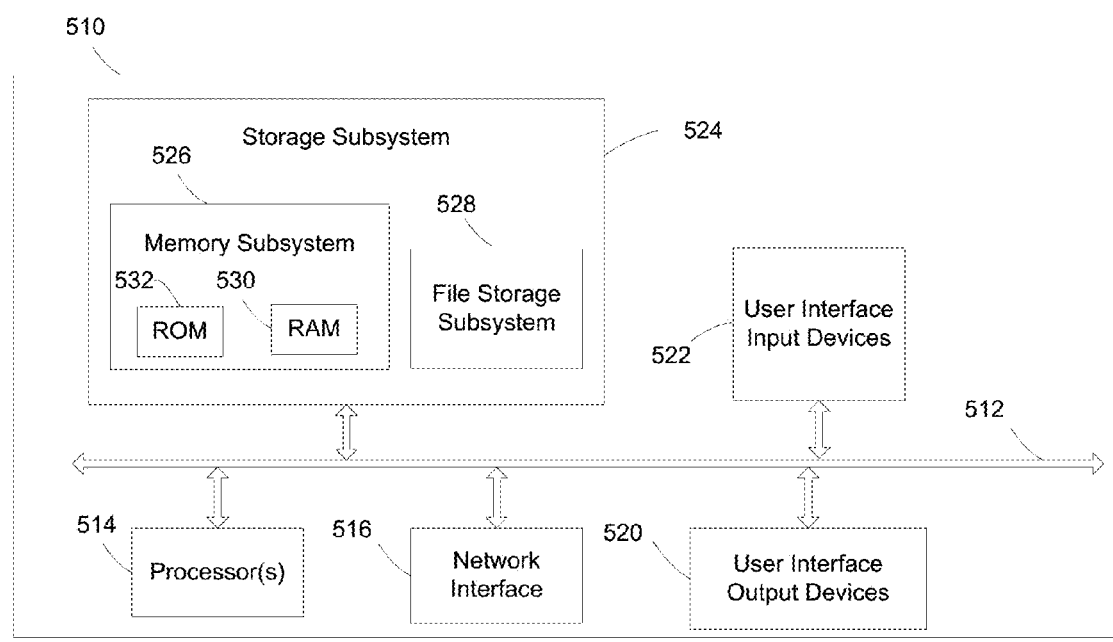
FIG. 4A illustrates an example of a plurality of words of a word grouping and their inverse document frequency weightings.
FIG. 4B illustrates an example of the words of FIG. 4A and their un-normalized contextual weightings.
FIG. 5 illustrates a block diagram of an example computer system.

FIG. 4A illustrates an example of a plurality of words of a word grouping and their inverse document frequency weightings. FIG. 4B illustrates an example of the words of FIG. 4A and their un-normalized contextual weightings. The inverse document frequency weightings of the word grouping may be determined through analysis of frequency of those words in a corpus utilizing one or more techniques such as those known in the art. The contextual weightings may be determined through analysis utilizing, for example, steps of FIG. 1 and/or FIG. 2. As illustrated, words of the word grouping of FIG. 4A are provided with inverse document frequency weightings that are distinct form the contextual weightings of FIG. 4B. For example, jumbo was a rare word in the corpus compared to the other words in the word grouping and is therefore assigned a high inverse document frequency weighting. However, jumbo is not at all likely to co-occur with other words in the word grouping and is therefore assigned low contextual weighting. Also, as illustrated, the contextual weightings have identified those words of the word groupings that often have a relationship to other words of the word grouping. For example, birds, nature, and water all have high co-occurrence probability, meaning they often co-occur with the other words of the word grouping (e.g., birds may often co-occur with nature, water, Florida, duck, flight, bald).

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to create co-occurrence relationships between words in a corpus of word groupings and/or logic to contextually weight words in a word grouping as a function of which other words are present in the word grouping according to one or more processes described herein.

These software modules are generally executed by processor 514 alone or in combination with other processors. Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer implemented method of determining a co-occurrence relationship between words in a corpus of word groupings, comprising:
    identifying a plurality of word pairs from a vocabulary of words;
    determining, utilizing one or more processors, a co-occurrence probability for each of the word pairs in a corpus having a plurality of word groupings, each of the co-occurrence probability is based on the probability of co-occurrence of a single of the word pairs in a single of the word groupings;
    wherein determining the co-occurrence probability for a word pair of the word pairs comprises determining a weighted count of the word groupings in which the word pair is present, wherein a word grouping of the word groupings in which the word pair is present is from a document, and wherein the weight of the contribution of the word grouping to the weighted count is based on at least two of frequency of occurrence, field weighting, and decorations of both words of the word pair in the document;
    determining, utilizing one or more processors, a co-occurrence consistency for each of the word pairs by comparing the co-occurrence probability for each of the word pairs to an incidental occurrence probability for each of the word pairs, the incidental occurrence probability for each of the word pairs being specific to a respective of the word pairs;
    creating a co-occurrence consistency matrix with the co-occurrence consistency for each of the word pairs;
    receiving, by a search engine, a query submitted to the search engine by a user, the query including a word grouping having a plurality of word grouping words;
    identifying, by the search engine and based on the co-occurrence consistency matrix, the co-occurrence consistency for each of a plurality of the word pairs in the word grouping words;
    performing, by the search engine, a link analysis on the word grouping words utilizing the identified co-occurrence consistencies for the plurality of the word pairs in the word grouping words as weighting factors in the link analysis;
    assigning, by the search engine, a contextual weight to each of a plurality of the word grouping words based on the link analysis; and
    providing, by the search engine and based on the assigned contextual weights, results to the query submitted to the search engine by the user.

2. The method of claim 1, further comprising omitting certain of the word pairs from the co-occurrence consistency matrix having the co-occurrence consistency that is below a co-occurrence consistency threshold value.

3. The method of claim 1, further comprising creating a co-occurrence count matrix with the weighted count for the word pair and with counts for other of the word pairs.

4. The method of claim 3, wherein the counts for the other of the word pairs are weighted counts.

5. The method of claim 3, further comprising omitting, from the co-occurrence count matrix, certain of the word pairs having a respective of the counts that is below a co-occurrence count threshold value.

6. The method of claim 5, further comprising omitting certain of the word pairs from the co-occurrence consistency matrix having the co-occurrence consistency that is below a co-occurrence consistency threshold value.

7. The method of claim 1, wherein the step of determining the co-occurrence consistency for each of the words pairs includes comparing the co-occurrence probability of each of the word pairs to marginal probabilities of the words of each of the word pairs.

8. The method of claim 7, wherein the step of determining the co-occurrence probability for the word pair includes determining a co-occurrence total for all of the word pairs and dividing the weighted count by the co-occurrence total.

9. The method of claim 1, wherein the word groupings include at least one of tags for images, tags for videos, ad keywords, words from queries, words from documents, and words from social networking posts.

10. A system including memory and one or more processors operable to execute instructions stored in the memory, comprising instructions to:
identify a plurality of word pairs from a vocabulary of words;
determine a co-occurrence probability for each of the word pairs in a corpus having a plurality of word groupings, each of the co-occurrence probability is based on the probability of co-occurrence of a single of the word pairs in a single of the word groupings;
determine a co-occurrence consistency for each of the words pairs by comparing the co-occurrence probability for each of the word pairs to an incidental occurrence probability for each of the word pairs, the incidental occurrence probability for each of the word pairs being specific to a respective of the word pairs;
wherein the instructions to determine the co-occurrence probability for a word pair of the word pairs comprise instructions to determine a weighted count of the word groupings in which the word pair is present, wherein a word grouping of the word groupings in which the word pair is present is from a document, and wherein the weight of the contribution of the word grouping to the weighted count is based on at least two of frequency of occurrence, field weighting, and decorations of both words of the word pair in the document;
create a co-occurrence consistency matrix with the co-occurrence consistency for each of the word pairs;
receive, by a search engine of the system, a query submitted to the search engine by a user, the query including a word grouping having a plurality of word grouping words;
identify, by the search engine and based on the co-occurrence consistency matrix, the co-occurrence consistency for each of a plurality of the word pairs in the word grouping words;
perform, by the search engine, a link analysis on the word grouping words utilizing the identified co-occurrence consistencies for the plurality of the word pairs in the word grouping words as weighting factors in the link analysis;
assign, by the search engine, a contextual weight to each of a plurality of the word grouping words based on the link analysis; and
provide, by the search engine and based on the assigned contextual weights, results to the query submitted to the search engine by the user.

11. The system of claim 10, wherein the instructions further comprise instructions to omit certain of the word pairs from the co-occurrence consistency matrix having the co-occurrence consistency that is below a co-occurrence consistency threshold value.

* * * * *